United States Patent [19]
Wynalda, Jr.

[11] Patent Number: 5,960,949
[45] Date of Patent: Oct. 5, 1999

[54] ADAPTABLE RECORD-HOLDER FOR USE IN PACKAGES AND THE LIKE

[75] Inventor: Robert M. Wynalda, Jr., Comstock Park, Mich.

[73] Assignee: Wynalda Litho, Inc., Rockford, Mich.

[21] Appl. No.: 09/186,861

[22] Filed: Nov. 5, 1998

Related U.S. Application Data

[60] Provisional application No. 60/064,909, Nov. 7, 1997.

[51] Int. Cl.⁶ .................................................. B65D 85/57
[52] U.S. Cl. ........................ 206/307.1; 206/310; 206/493
[58] Field of Search ................................ 206/232, 307.1, 206/308.1, 309, 310, 311, 312, 493

[56] References Cited

U.S. PATENT DOCUMENTS

| | | | |
|---|---|---|---|
| 2,866,541 | 12/1958 | Ravis | 206/62 |
| 3,288,543 | 11/1966 | Sugerman | 312/12 |
| 3,990,574 | 11/1976 | Roccaforte | 206/387 |
| 3,998,324 | 12/1976 | Roccaforte | 206/387 |
| 4,189,087 | 2/1980 | Dlugopolski | 229/19 |
| 4,453,631 | 6/1984 | Mark | 206/313 |
| 4,488,644 | 12/1984 | Wynalda | 206/387 |
| 4,520,470 | 5/1985 | d'Alayer de Costemore d'Arc | 369/72 |
| 4,561,544 | 12/1985 | Reeve | 206/540 |
| 4,771,883 | 9/1988 | Herr et al. | 206/313 |
| 4,925,023 | 5/1990 | Goldblatt et al. | 206/309 |
| 5,000,316 | 3/1991 | Lerner | 206/309 |
| 5,088,599 | 2/1992 | Mahler | 206/313 |
| 5,275,291 | 1/1994 | Sledge | 206/531 |
| 5,291,990 | 3/1994 | Sejzer | 206/45.11 |
| 5,360,107 | 11/1994 | Chasin et al. | 206/313 |
| 5,379,890 | 1/1995 | Mahler | 206/310 |
| 5,529,182 | 6/1996 | Anderson et al. | 206/310 X |
| 5,533,614 | 7/1996 | Walker | 206/310 X |
| 5,709,300 | 1/1998 | Bolognia et al. | 206/308.1 |
| 5,782,348 | 7/1998 | Burdett | 206/310 X |
| 5,819,928 | 10/1998 | Wynalda, Jr. | 206/308.1 |

FOREIGN PATENT DOCUMENTS

| | | |
|---|---|---|
| 0904804 | 7/1992 | Canada . |
| 0021009 | 12/1907 | United Kingdom . |
| 2079726 | 1/1982 | United Kingdom . |
| WO9222903 | 12/1992 | WIPO . |

*Primary Examiner*—Jacob K. Ackun
*Attorney, Agent, or Firm*—Price, Heneveld, Cooper, DeWitt & Litton

[57] ABSTRACT

A selectively adaptable holder or carrier for recordings ("records") is disclosed which includes a universally configured base (record-holder) which is made to be slidably receivable within a sleeve-like outer package component, and a plurality of different record-retaining members that are interchangeably mountable upon a universal mount structure provided on the base. In one embodiment, the universal mount structure may comprise a cylindrical projection formed centrally on the base, and the interchangeable, selectively mountable record-retaining members may include a corresponding cylindrical recess to fit over such projection, to be secured thereto by adhesive or other bonding agent or process. Each of the record-retaining members preferably includes an elastically yieldable interlock structure which is extendable through a corresponding aperture in the record member or its outer housing or case, and has portions overlying at least part of the record member or its case so as to interlock the latter onto the universal mount structure and base. Examples of three different such record-retaining structures are disclosed, but the specific record-engagement structure of the same is optional so long as the interchangeable mounting is maintained.

14 Claims, 1 Drawing Sheet

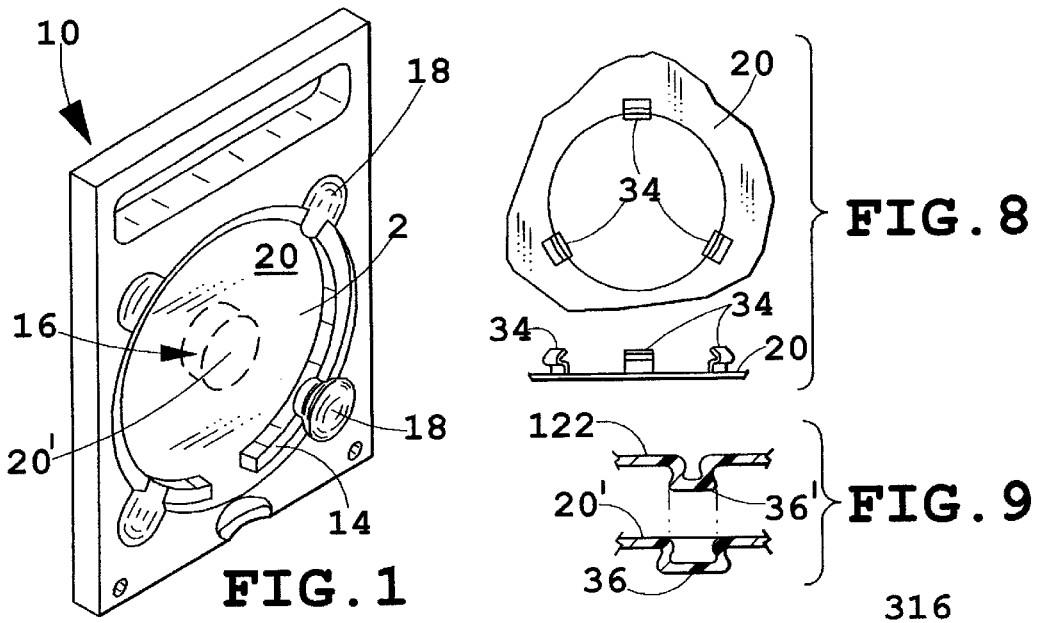
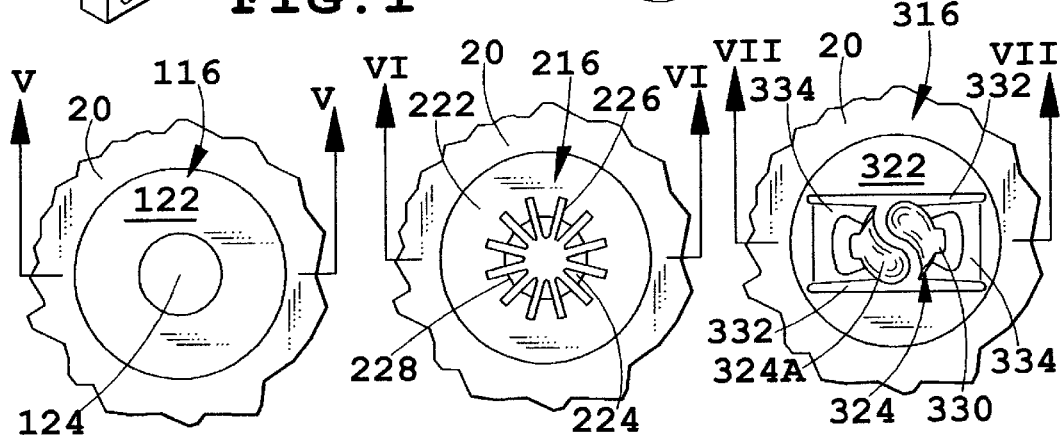
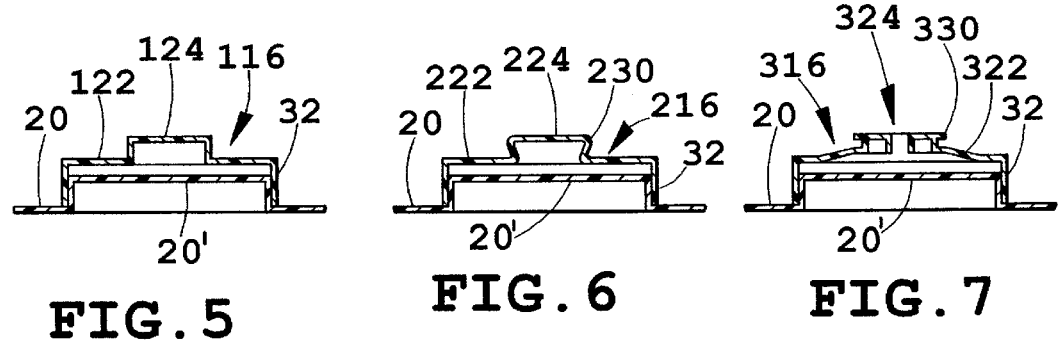

ADAPTABLE RECORD-HOLDER FOR USE IN PACKAGES AND THE LIKE

CROSS-REFERENCE TO RELATED APPLICATION

This application claims priority under 35 U.S.C. § 119(e) on U.S. Provisional Application Ser. No. 60/064,909 entitled ADAPTABLE RECORD-HOLDER FOR USE IN PACKAGES AND THE LIKE, filed Nov. 7, 1997, by Robert M. Wynalda Jr., the entire disclosure of which is incorporated herein by reference.

BACKGROUND OF THE INVENTION

This invention relates generally to packages, i.e., cartons or containers, for recordings ("records") such as cassette tapes or disks, particularly recordings of programmatic materials such as audio, video, computer software, etc. In a more particular sense, the invention relates to packages of the aforementioned nature which are particularly intended for disk-type recordings, especially those of the type currently known as "compact disks" ("CDs"), or CD-ROMs, DVDs, etc. From another perspective, the invention relates to the mounting and storing, for shipment, sale and consumer handling, of records of disk-like form having a mounting aperture in the center.

Co-pending patent application (Ser. No. 08/811,475, now U.S. Pat. No. 5,819,928), by the same inventor and assigned to the same owner as the present application, discloses background information and preferred embodiments of an improved package/container for recordings and records of the above-mentioned types, basically comprising a sleeve-like outer container and a record-holder which is slidably receivable within such sleeve-like outer container. The record is conveniently and reliably held in place upon the holder, and both are safely retained within the container during periods of non-use but readily accessible for use by sliding the record-holder out of the sleeve-like container and removing the record. One end of the record-holder is retained within the package, and thus remains connected to it as a unit, even when the holder is withdrawn for removing the record. This provides for more convenient handling, and the holder may be slid back into the container while the record is being used, the resulting unit being conveniently stored until use of the record is completed. At that time, the record may readily be returned to its previous mounted position upon or within the holder, and the latter slid back into the container for storage of the record and container together. Earlier examples of similar record containers are also shown in commonly owned prior U.S. Pat. No. 4,488,644 (Re. 32,296) and U.S. Pat. No. 5,088,599, both of which are incorporated herein by reference, along with U.S. Pat. No. 5,819,928 which issued from co-pending application Ser. No. 08/811,475, for further information and background.

Record-holders of the type noted above typically include a centralized hub on which the record is supported in place for storage in the sleeve-like outer container, and often include some easily operated releasable means for reliably securing the record in its position on such hub, so that the record will stay in its attached position on the record-holder when the latter is slid into and out of the outer container, and during the time it remains within the container. In many such cases, such retainers comprise some resiliently yieldable structure atop the hub which fits into and through the central aperture in the disk, with some type of resiliently yieldable member that will lie over the top side of the disk and secure it in place atop the hub. To achieve maximum efficiency and economy, such structures are usually molded integrally with the record-holder, as part of the hub structure, and a typical such retainer structure simply comprises a somewhat under-cut or mushroom-shaped hollow cylindrical projection atop the center of the hub, which is radially slotted in numerous places to provide a plurality of circumferentially arranged projections which are yieldable as a result of their size and deflectability, i.e., the elasticity of the relatively thin polymeric material of which the record-holder is formed. At least several such retainer configurations are known in the art, each having a specifically different design and shape but serving the same basic purpose and for the most part operating in a similar manner. Typically, the different record manufacturers have their own preferences regarding these retainer configurations, and since the record-holders are usually an integral one-piece structure made in the most economical way (for example, by vacuum-molding, from sheet material, or by injection molding), the result is that each such different preference in record retainer structure requires that an entirely different record-holder or slide tray must be manufactured and separately inventoried, etc., one for each different record manufacturer. This is an inefficient as well as inconvenient procedure, but it is nonetheless the prevailing situation in actuality.

BRIEF SUMMARY OF THE INVENTION

The present application provides improvements in and for the record-holder for container/packages of the type described above, the general nature of which is illustrated in the prior patents and co-pending application just noted. More particularly, the present invention provides improvements in the disk-engaging and disk-retention structure utilized in the record-holders and, in particular, provides a concept and structure by which a basic, universally configured base (record-holder) structure is utilized, allowing carton and package manufacturers to produce only a single kind of record-holder structure, to greatly ease manufacturing and inventorying requirements, as well as related shipping expenses, delivery difficulties, delays, etc. Furthermore, the novel universally-configured record-holder provided herewith also preferably provides for the use of different specific disk-retention componentry, which may be selected according to a manufacturer's wishes or preferences, and used with the universally configured record-holder.

Accordingly, the present invention provides, by way of preferred embodiments, a standard or universally configured record-holder structure which accepts and utilizes interchangeable and/or replaceable disk-mounting and disk-retaining structures. For example, the present invention provides an adaptable record-holder for use in packages and the like, which includes a record-holder base having an effective length and width at least somewhat larger than that of a record to be held thereby and an overall shape permitting it to be inserted into an outer cover, said record-holder base having a hub-retention means located generally centrally thereof, and a free, separate hub selectively mountable upon said hub-retention means, said hub including at least one record-engagement element adapted to releasably hold and retain a record member upon said hub and thereby releasably retain said record member upon said record-holder for insertion into said outer cover.

The foregoing objectives and advantages of the present invention will become more apparent upon consideration of the ensuing specification and the attached drawings, which set forth one or more particular preferred embodiments of the invention.

BRIEF DESCRIPTION OF THE DRAWING

FIG. 1 is a front perspective view generally illustrating a record-holder in accordance with the invention;

FIG. 2 is an enlarged, fragmentary overhead plan view depicting a first embodiment of the central hub structure for the record-holder of FIG. 1;

FIG. 3 is an enlarged, fragmentary overhead plan view depicting a second embodiment of the central hub structure for the record-holder of FIG. 1;

FIG. 4 is an enlarged, fragmentary overhead plan view depicting a third embodiment of the central hub structure for the record-holder of FIG. 1;

FIG. 5 is a cross-sectional elevational view taken along the plane V—V of FIG. 2;

FIG. 6 is a cross-sectional elevational view taken along the plane VI—VI of FIG. 3;

FIG. 7 is a cross-sectional elevational view taken along the plane VII—VII of FIG. 4;

FIG. 8 is a vertically aligned fragmentary overhead plan view and fragmentary side elevational view illustrating a further embodiment of the invention; and FIG. 9 is an enlarged, fragmentary exploded view showing a pair of vertically mutually engageable attachment structures.

DESCRIPTION OF PREFERRED EMBODIMENTS

As illustrated in FIG. 1, the record-holder 10 comprises a generally rectangular member of predetermined thickness, which may conveniently be vacuum-formed from a desired "plastic" (i.e., polymeric) sheet, as well as injection-molded, etc. As illustrated, the record-holder 10 has a circular depression or recess 12 formed integrally therein, for receiving and retaining a record of generally corresponding diameter. Typically, the recess 12 has a ledge-like annular outer shoulder 14 for receiving the peripheral edge of the record, together with a base surface or floor 20 and a centrally located hub 16 of predetermined configuration, which interfits with the central aperture of the disk-like record to be stored in the holder 10. In addition, the holder 10 has one or more inclined, ramp-like recesses 18 (four being shown) for providing convenient finger access to the edges of the stored disk, to facilitate removal thereof from the holder 10. Preferably, the holder 10 is of one-piece construction, such that the recess 12, shoulder 14, hub 16, finger recesses 18, and floor surface 20 are all integral with the remainder of the holder and formed as part of the same process.

In accordance with the invention, hub 16 may have a number of different specific configurations, according to the preference of the particular disk manufacturer or recording source. Three examples of known such hub configurations are illustrated in overhead plan views FIGS. 2, 3, and 4, and in corresponding central sectional views thereof in FIGS. 5, 6, and 7. Of these, FIGS. 2 and 5 show a first variation 116 of the basic hub 16, which essentially comprises merely an upraised generally flat, disk-like portion 122 which surrounds a further upraised circular hub 124, which is sized closely to and frictionally interfits within the center hole in the disk to be retained, such that the body of the disk rests atop the annular portion 122 surrounding hub 124.

FIGS. 3 and 6 show a second hub variation 216 which is similar to hub 116 of FIGS. 2 and 5 but which includes a series of radially extending slots 226 formed concentrically with the upraised central hub portion 224 and, optionally or preferably, extending outward into the adjacent annular area 222, such that the upwardly extending hub portion 224 may be diametrically constricted or contracted resiliently when a recording disk having a nominally smaller center aperture is pushed downwardly concentrically over the slotted, upraised hub portion 224, to thereby receive and securely retain such disk in place. That is, each pair of adjacent slots 226 in effect defines a resiliently deflectable upraised segment 228, and these may be shifted toward the center of hub 224 by pushing the center of the disk downwardly over them, after which they will resiliently retract back into their original position to securely hold the disk in place. To facilitate this operation and effect, hub 224 preferably has a rounded-off (radiused) edge extremity 230, and is at least slightly conical in overall form, having a larger diameter at the top than at the bottom, so that the tops of the deflectable segments 228 will actually extend at least slightly over the top of the disk around the perimeter of its center opening when the disk has been seated in place over the hub 224.

FIGS. 4 and 7 show a third variation 316 of such a generally known hub construction, which is somewhat more complex than that of FIGS. 3 and 6 but similar to the latter in a number of ways. That is, hub version 316 has a generally annular upper section 322 which carries a disk seated thereupon for packaging or storage, and also has an upraised central portion 324, which has a pair of oppositely disposed protruding retainer tabs or lugs 330 that fit over the top of a disk seated on annular portion 322. Hub version 316 is a more complex structural formation in that it includes a pair of interconnected slot-like recesses 332 which between them form a pair of resiliently deflectable finger-like tabs 334, each of which carries an opposed half 324A of the partially circular center portion 324. Preferably, these oppositely disposed generally semicircular portions 324A are made to have an upwardly rounded, somewhat dome-like shape which helps to center the record thereupon. In use, hub version 316 is much like hub version 216 in that the disk to be stored is placed atop the upwardly extending generally circular hub portion 324 and then simply pushed downwardly, whereupon the spring-like fingers 334 readily flex downwardly. When this occurs, the effective overall diameter of the two semicircular hub portions 324A becomes smaller, since each of the adjacent segments thereof then move toward one another. This allows the record disk to pass over the protruding ledge-like elements 330 and come to rest atop the resiliently deflectable annular surface 322. As a result, when the downward pressure on the disk is released, the resilient portions 334 spring back upwardly into their nominal position and trap the disk under the ledge like portions 330.

In accordance with the present invention, each of the different types of hub configurations 116, 216, and 316 (which are principally shown and described herein to illustrate known examples of such configurations that are usable in practicing the present invention) are made to be interchangeably mountable on the record-holder 10 to accommodate different manufacturers and/or packagers, thereby providing a packaging flexibility not previously available. This allows a basic, standardized record-holder 10 to be manufactured and held in inventory, to be joined with any of several different types of center hub structure when and as desired, thereby obviating the necessity of manufacturing and storing each of a number of different types of record-holders which principally vary from one another only by the disk-mounting central hub structure. In order to accomplish this goal, a preferred embodiment of the present invention contemplates that the standardized holder 10 (FIG. 1) will have a locating and hub-mounting structure or area 16 positioned centrally on the base or floor portion 20 of recess 12, one useful such structure being simply an upraised cylindrical protrusion or boss 20' which comprises an integral portion of the recessed floor 20 (FIGS. 1, 5, 6, and 7). With such a cylindrical boss, the different hub embodiments 116, 216, and 316 etc. may conveniently be formed as a corresponding cylindrically recessed, dished element having an annular side wall 32 that seats directly over the sides of the upraised cylindrical boss 20'. In this configuration, the upraised boss 20' automatically, accurately and conveniently locates the optionally mountable hubs 116, 216, 316, etc., which may simply be frictionally secured thereto, or more preferably, glued or ultrasonically fused in place by rapid and automated assembly procedures.

As may occur to those skilled in the art upon reading the foregoing disclosure and contemplating the associated drawings, other types of hub structures will readily lend themselves to the interchangeable or selectively mountable hub concept provided in accordance with the present invention. Further, other means of mounting and holding the interchangeably mountable hubs may readily be contemplated once the underlying concept is grasped. Two such possible variations are illustrated in FIGS. 8 and 9 hereof, of which FIG. 8 shows a series (for example, three) of mutually spaced, upraised, deflectable fingers 34 disposed on a circular locus generally corresponding to the diameter of the boss 20' (i.e., that of side wall 32), over which the interchangeable hub elements 116, 216, etc. may be snapped into position. In this embodiment, it may be desirable to form an annular or other such rib extending around the inside of each such hub structure, at the bottom of its side wall 32, which will index over the barb-like, outwardly extending edge of the deflectable fingers 34 to augment the retention of the hub thereupon. Another such readily attachable, snap-fit structure is illustrated in FIG. 9, which shows a pair of frictionally interengageable (i.e., nestable) blister-like recesses 36, 36', one formed in the top of boss 20' of recess 12 and the other in annular edge 122 of the hub structures 116, etc., in an arrangement somewhat analogous to that of the deflectable fingers 34 mentioned just above, whereby the interchangeably mountable hubs may be snapped securely into position and thus mounted upon the standardized holder 10.

As will be apparent from the foregoing, the concept underlying this invention is the provision of optionally and selectively interchangeable or interchangeably mountable disk (or other record) retaining hub substructures, which are conveniently mountable upon a standardized record-holder 10 for use in packaging, storing, etc. of disk-type or other such records. The basic concept is interchangeability, or, more accurately, selectively mountable hubs or other such structures for use with standardized (or, for that matter, non-standardized, but basic) record-holders, to achieve greater manufacturing and storage flexibility.

It is believed that the significant advantages provided by the present invention will be apparent upon consideration of the foregoing disclosure, and it is to be noted once again that an underlying concept is advanced which is specifically different from those addressed by the prior state of the art, notwithstanding the superficially similar attributes. It is to be understood that the foregoing detailed description is merely that of certain exemplary preferred embodiments of the invention, and that numerous changes, alterations and variations may be made without departing from the underlying concepts and broader aspects of the invention as set forth in the appended claims, which are to be interpreted in accordance with the established principles of patent law, including the doctrine of equivalents.

The invention claimed is:

1. An adaptable record-holder for use in packages and the like, comprising in combination:

a record-holder base having an effective length and width at least somewhat larger than that of a record to be held thereby and an overall shape adapted to be inserted into an outer cover, said record-holder base having a hub-retention means located generally centrally thereof; and a free, separate hub selectively mountable upon said hub-retention means, said hub including at least one record-engagement element adapted to releasably hold and retain a record member upon said hub and thereby releasably retain said record member upon said record-holder for insertion into said outer cover.

2. An adaptable record-holder as set forth in claim 1, further including a plurality of said free separate hubs, each having a different type of record-engagement element and being selectively interchangeably mountable upon said hub-retention means to thereby selectively adapt said record-holder base to a different type of releasable record-holding and retaining arrangement.

3. An adaptable record-holder as set forth in claim 1, wherein said record-holder base comprises a generally rectangular and generally planar member, and said hub-retention means comprises a structure secured to said member and projecting generally laterally thereof.

4. An adaptable record-holder as set forth in claim 3, wherein said hub-retaining means comprises a laterally-offset portion of said generally rectangular and generally planar member.

5. An adaptable record-holder as set forth in claim 4, wherein said laterally-offset portion of said generally rectangular and generally planar base member comprises a generally cylindrical projection.

6. An adaptable record-holder as set forth in claim 5, wherein said generally cylindrical projection is an integral part of said base member and one-piece therewith.

7. An adaptable record-holder as set forth in claim 1, wherein said free separate hub has a record-engagement element comprising a projection which is at least partially extendable through a mounting aperture in said record to releasably hold and retain said record by contact therewith.

8. An adaptable record-holder as set forth in claim 7, wherein said record-engagement projection is sized and configured to frictionally engage said mounting aperture in said record.

9. An adaptable record-holder as set forth in claim 7, wherein said record-engagement projection includes a portion which is located and disposed to overlap and overhang the perimeter of said mounting aperture in said record.

10. An adaptable record-holder as set forth in claim 7, wherein said record-engagement projection has resiliently deformable portions arranged to diametrically contract said projection.

11. An adaptable record-holder as set forth in claim 10, wherein said record-engagement projection includes a portion which is located and disposed to overlap and overhang the perimeter of said mounting aperture in said record.

12. An adaptable record-holder as set forth in claim 7, wherein said record-engagement projection includes a radially slotted generally cylindrical structure.

13. An adaptable record-holder as set forth in claim 12, wherein said projection is at least somewhat mushroom-shaped.

14. An adaptable record-holder for releasably retaining a recorded member in fixed position, comprising in combination:

a support base having generally co-planar length and width portions and a generally central mounting structure for a separate record-retainer member; and a plurality of mutually different separate record retainer members, each having a different type of record-engagement and retention structure and each being selectively and interchangeably mounted on said mounting structure of said support base to thereby selectively adapt said record-holder base to a different type of releasable record-holding and retaining arrangement.

\* \* \* \* \*